Figure 4:
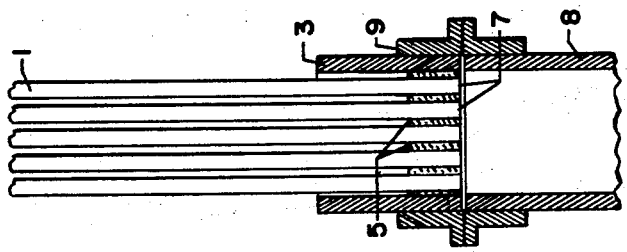

Nov. 22, 1960 J. B. HUNTER ET AL 2,961,062
LARGE SURFACE AREA HYDROGEN PERMEATION CELL
Filed Oct. 6, 1958 2 Sheets-Sheet 1

JAMES B. HUNTER
GEORGE M. HICKEY
INVENTORS

ATTEST:
M. J. Frimer

BY Norbert E. Birch

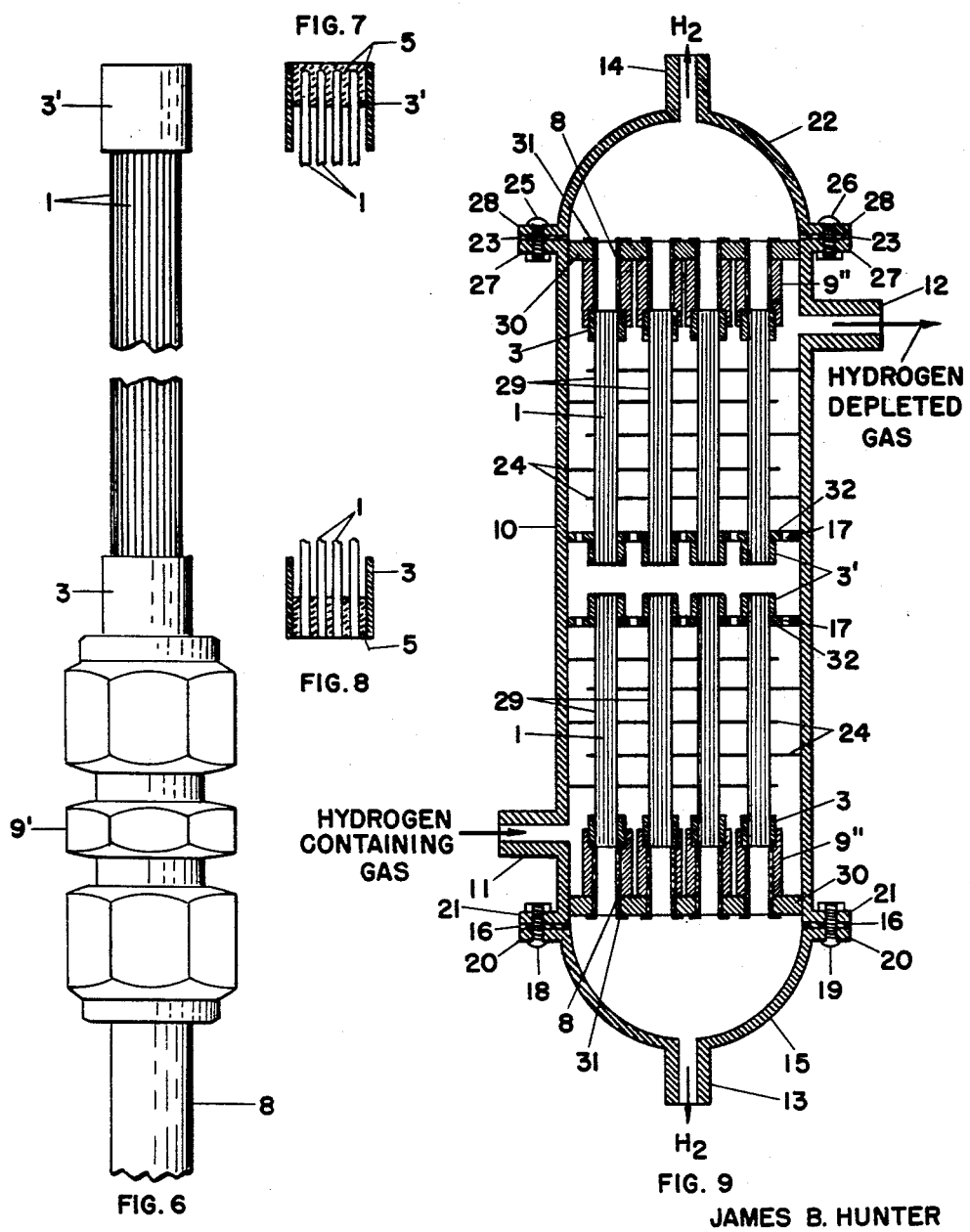

United States Patent Office 2,961,062
Patented Nov. 22, 1960

2,961,062

LARGE SURFACE AREA HYDROGEN PERMEATION CELL

James B. Hunter, Newtown Square, and George M. Hickey, Paoli, Pa., assignors of one-half to The Atlantic Refining Company, Philadelphia, Pa., a corporation of Pennsylvania, and one-half to J. Bishop and Company Platinum Works, Malvern, Pa., a corporation of Pennsylvania Filed Oct. 6, 1958, Ser. No. 765,354

3 Claims. (Cl. 183—2)

This invention relates to a hydrogen permeation cell. More particularly, this invention relates to a large surface area hydrogen permeation cell comprising a cluster of unsupported capillary tubes of a palladium-containing metal.

It is known that hydrogen may be separated and purified from a gaseous mixture containing hydrogen and other gases by allowing the hydrogen to permeate selectively at elevated temperatures through a barrier consisting of a palladium-containing metal. A process for such separation and purification utilizing a barrier consisting of a silver-palladium composition is described in United States Patent No. 2,773,561 to Hunter. In this process hydrogen under pressure is brought into contact with one side of the supported thin layer or film of a non-porous silver-palladium alloy. The other side of the silver palladium layer is maintained at a lower pressure. The hydrogen is permeated through the film of silver-palladium and removed in a purified form.

Among the factors upon which the permeability of hydrogen through films is dependent are the thickness of the film, the pressure differential between the high and low pressure side of the film, the temperature of the film and the material from which the film is made.

Although the selectivity of a film, i.e. the ability of the film to permit a particular gas to permeate therethrough, does not depend upon the thickness of the film, the rate of permeation is inversely proportional to such thickness. Since high transfer rates are essential for the commercial feasibility of permeable barriers, it is necessary that the permeable film be as thin as possible, consistent with structural stability under commercial operating conditions, and that it provide a sufficiently large surface area for permeation. In order to sustain high permeation rates with thin films having large surface areas, it has been necessary heretofore, because of the substantial pressure differentials required, to utilize films supported on a backing such as porous metal, ceramic, screen gauze or other suitable material to preclude distortion or collapse of the films. An example of a process utilizing a sheet of palladium film maintained at an elevated temperature and supported by a base of porous earthenware or Alundum is described in United States Patent No. 1,174,631 to Snelling.

For commercial operations where high transfer rates are desired it is also necessary to have a large surface area of permeable barriers per unit of volumetric space occupied by the permeation apparatus. Much effort has been directed towards the attainment of a permeation apparatus wherein the surface area of permeability is maximized. Thin walled barriers, as stated heretofore, require a porous metal or ceramic backing when subjected to a substantial pressure differential. Attempts to produce large surface area membranes of about 0.001 inch in thickness by rolling, vapor deposition and electroplating have proven unsatisfactory. Rolled films having large surface areas are difficult to fabricate without pin holes and require special techniques, such as ultrasonic welding for joining. Vapor deposition is an extremely slow and impracticable process and electroplating results in membranes that are porous even to hydrocarbon gases. Similar difficulties are encountered in fabricating thin walled membranes around solid backings such as stainless steel or plastics. Attempts to increase the surface areas of permeability by joining a number of permeation cells serve only to multiply these difficulties.

It has also been proposed to utilize elongated tubes or coiled tubes without backing either singly or in multiples in the form of a cell in order to increase the surface area of permeability, but these also require supports in order to prevent the thin membranes from collapsing when they are subjected to a high pressure differential. In addition, the use of long tubes introduces a large pressure drop within the tubes and results in a decreased flow rate. Where a multiplicity of permeable membranes have been used heretofore, in the form of flat layers, rolled membranes or tubes, it has been necessary to seal each membrane individually into the cell unit thus increasing the probability of malfunction of the unit, and making the task of replacement and interchangeability more difficult and expensive.

It is therefore an object of this invention to produce large surface area permeation cells which will selectively separate and purify hydrogen from gaseous mixtures containing the same at a high permeation rate.

It is a further object of this invention to produce large surface area permeation cells having thin walled barriers which will selectively separate and purify hydrogen from gaseous mixtures without the utilization of internal or external supports.

It is a further object of this invention to produce commercially feasible and inexpensive large surface area permeation cells by a method whereby a plurality of permeable barriers are secured in a manner to form a unit cell.

It is a further object of this invention to produce large surface area permeation cells which may be aligned in multiples in a hydrogen purification or separation apparatus and may be readily replaced or interchanged.

Other objects and advantages will be apparent from a reading of the following description and the appended claims.

It has now been discovered that large surface area permeation cells for selectively separating hydrogen from gaseous mixtures at a high permeation rate may be produced by fixedly securing longitudinally in a cluster a plurality of unsupported capillary tubes of palladium or a palladium alloy. In accordance with this invention palladium-containing metal capillary tubes are drawn to a wall thickness of from 0.001 to 0.005 inch and a bore of from $\frac{1}{32}$ to $\frac{1}{8}$ inch. It is preferred to have a wall thickness of about 0.003 inch and a bore of about $\frac{1}{16}$ inch. The tubes are cut to a relatively short length so that the pressure drop of the gas flowing through the tubes is minimized and a high permeation rate can be maintained. In practice a length of two feet or less has been found to give the best results. In addition, the utilization of relatively short tubes facilitates handling and fabrication. The bores of the tubes are closed at both ends by a flame or other suitable means and the tubes are gathered into a cluster. A relatively tight fitting retaining sleeve of any suitable metal is placed around the cluster of tubes at one extremity so as to frictionally engage the cluster and the tubes and sleeve are dipped into a molten sealing compound. Since the bores are sealed, the sealing compound rises by capillary action between the exterior walls of the capillary tubes and between the interior wall of the retaining sleeve and the exterior walls of the peripheral capillary tubes. Upon cooling, the sealing compound solidifies, following which a portion of the tube cluster and sleeve is cut transversely of the cluster at a point intermediate the height of the solidified sealing compound between the individual tubes whereby the bores are again opened while the tubes remain sealed together to each other and to the retaining sleeve. The bore openings of the tubes are placed in communication with a stainless steel or other suitable conduit for collecting the hydrogen and the tubes are manifolded to the conduit by sealing the sleeve to the conduit by any suitable coupling means.

In practicing the instant invention it may or may not be desired that the bores of the individual capillary tubes of a tube cluster be open at both ends. If it is so desired, the sealing and cutting operations previously described are applied to the tube cluster at the opposite extremity. If not, then the bores of the individual tubes of the tube cluster are permitted to remain closed at their opposite ends. In making permeation cells having capillaries whose bores are closed at one extremity, it may also be desired to seal the tubes together at this extremity. If so, the sealing operation hereinabove described is repeated at this extremity but the bores of the tubes are not cut open at this extremity.

Figure 5:
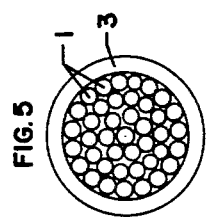
Figure 1:
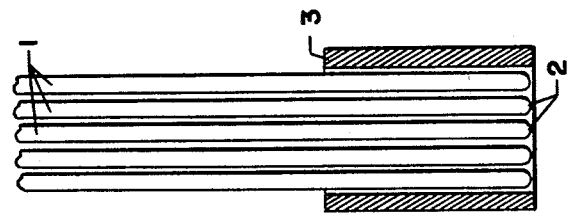

For a better understanding of the instant invention reference may be had to the accompanying drawings in which Figures 1 to 4 are vertical sectional views representing the steps in the process of the instant invention, Figure 5 is a plan view of Figure 1, Figure 6 is an elevational view of one embodiment of a permeation cell of the instant invention, Figure 7 is a vertical sectional view of retaining sleeve 3' in Figure 6, Figure 8 is a vertical sectional view of retaining sleeve 3 in Figure 6 and Figure 9 is a vertical sectional view of a hydrogen permeation apparatus utilizing a series of cells of the instant invention.

Figure 3:
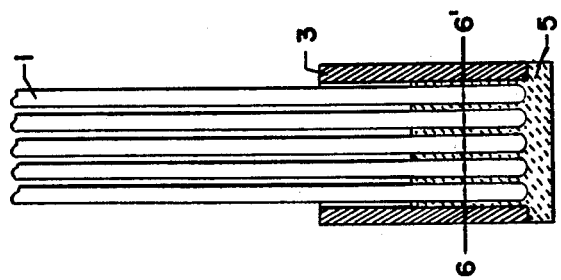
Figure 2:
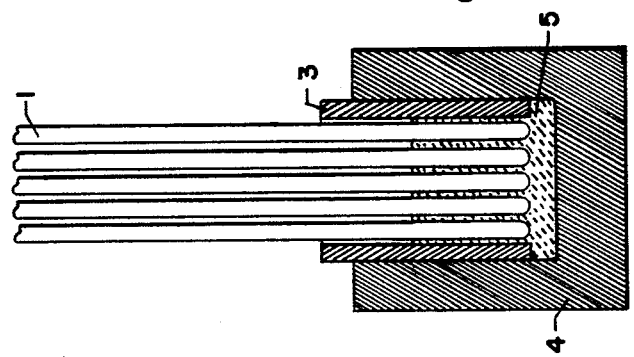

Referring to Figure 1, there is shown a cluster 1 of capillary tubes of a palladium-containing metal which were drawn to a wall thickness of about 0.0025 inch and a bore of about 1/16 inch and cut to a length of about 2 feet. The bores of the tubes were closed at both extremities. Retaining sleeve 3 was placed around the cluster of tubes at extremity 2. Figure 5 shows the capillaries 1 and the retaining sleeve 3 of Figure 1 in plan view. Whereas the individual tubes in Figures 1 to 4 are shown in spaced relationship for purposes of clarity, it can be seen from Figure 5 that they are actually adjacent one another in the form of a cluster. In Figure 2 the cluster of capillary tubes and the retaining sleeve were placed in a carbon crucible melting apparatus 4, containing a molten metal 5 consisting of silver solder. Instead of silver solder, gold solder, silver, gold or other suitable sealing metal or metal compound may be used. The size of the melting apparatus should be such that the cluster and sleeve fit tightly when inserted into the melting apparatus to preclude the molten metal from getting onto the outer wall of the retaining sleeve. The molten metal was allowed to cool and solidify and the tube unit was removed. Figure 3 shows the tubes with the solder 5 in between the outer walls of contiguous tubes and between the inner wall of the sleeve and the outer walls of the peripheral tubes. The tubes and sleeve were cut at line 6—6' with a saw or other suitable means. In Figure 4 the cluster of tubes and sleeve are shown cut off at one extremity so that the tubes are open at ends 7. Conduit 8 was placed in communication with the bore openings of cluster 1 of the capillary tubes and retaining sleeve 3 was sealed to conduit 8 by coupling means 9. Any suitable coupling means, such as a flange or fitting may be used. Alternatively the sleeve and the conduit may each be flanged at one end and coupled in this manner. A sealing compound such as gold, silver, gold solder or silver solder may be used to aid in sealing the coupling means to the sleeve and conduit.

Referring to Figure 6 there is shown a cluster 1 of unsupported capillary tubes of a palladium-containing metal, retaining sleeves 3 and 3' encircling the extremities of the cluster of tubes, conduit means 8 in communication with the bore openings of the tubes for collecting the permeated hydrogen and coupling means 9' for sealing retaining sleeve 3 to conduit means 8. Figure 7 is a cross sectional view of retaining sleeve 3' in Figure 6 and shows the silver solder 5 sealing the top extremities of the outer walls of contiguous tubes to each other and of peripheral tubes to the inner wall of the sleeve. Figure 8 is a cross sectional view of retaining sleeve 3 in Figure 6 and shows the silver solder 5 sealing the bottom extremities of the outer walls of contiguous tubes to each other and of peripheral tubes to the inner wall of the sleeve.

The permeation cell of the instant invention may be utilized in the form of a single cell or a multiplicity of such cells may be aligned in a permeation apparatus as shown in Figure 9. In Figure 9 there is shown a shell 10 provided with an inlet 11 for the hydrogen containing gaseous mixture, an outlet 12 for the hydrogen depleted gas and outlets 13 and 14 for the purified hydrogen. Shell cover 15 is secured to the shell by means of bolts 18 and 19 through flanges 20 and 21 and gasket 16. Shell cover 22 is secured to the shell by means of bolts 25 and 26 through flanges 27 and 28 and gasket 23. A group of permeation cells 29 which were manifolded in the manner described heretofore utilizing silver as the sealing means, is inserted through openings in headers 30 and fastened to the headers by flanging conduits 8 at their extremities 13. The conduits in communication with the bore openings were sealed to retaining sleeves 3 by coupling means 9''. The closed ends of the cluster 1 of silver-palladium capillary tubes are inserted through openings in retaining plates 32 which are provided with additional openings 17 to permit the gaseous flow therethrough. Baffles 24 guide the direction of the gaseous flow within shell 10. Retaining sleeves 3' are slipped around the closed ends of the tubes.

The hydrogen containing gaseous mixture is heated to an elevated temperature, for example 800° F. to 1200° F., and charged to inlet 11 under pressure, for example 100 to 200 p.s.i.g. Temperatures and pressures outside of these ranges may also be utilized. The hydrogen in the gaseous mixture permeates through the silver-palladium tubes and is collected at outlets 13 and 14. The hydrogen depleted gas is removed at outlet 12. The hydrogen containing gaseous mixture may also be charged to the apparatus under atmospheric pressure and outlets 13 and 14 connected to a vacuum line. If desired, the hydrogen containing gas may be charged at room temperature and means may be provided for heating the silver-palladium tubes, for example, by heating coils. The apparatus may also be modified, if desired, to contain a group of permeation cells whose capillaries are open at both extremities. In that event the tubes used would be manifolded at both extremities of each cell and the retaining sleeves in the lower bank of cells would be connected to the sleeves in the upper bank of cells by common conduits between the oppositely placed cells.

The capillary tubes used in the instant invention may be of palladium or a palladium alloy. It is preferred to utilize silver-palladium alloys containing from about 10 to about 50 percent silver, and more preferably from about 20 to about 40 percent silver. Other alloys of palladium which are permeable to hydrogen may also be used.

The apparatus of the instant invention may be utilized in processes wherein it is desired to separate hydrogen from other gases, to purify hydrogen or to remove hydrogen from a reaction zone.

It should be understood that this invention is not to be restricted to the specific embodiments described herein but that various modifications may be made without departing from the spirit thereof.

We claim:
1. A hydrogen permeation cell comprising a plurality of relatively thin walled, straight, relatively small diameter palladium-containing metal capillary tubes, fixedly secured longitudinally at one extremity of each tube and arranged in a cluster, each of said tubes being unsupported against either the remainder of its outer wall or inner wall otherwise than as against one another in the cluster, the whole of the tubes of the cluster being open only at the secured extremity of the cluster to permit permeation of hydrogen from a hydrogen-containing gas through the walls of the individual tubes of the cluster.

2. The permeation cell of claim 1 further characterized in that each of said tubes is of a palladium-silver alloy.

3. The permeation cell of claim 2 further characterized in that each of said tubes has a bore of $\frac{1}{32}$ to $\frac{1}{8}$ inches and a wall thickness of between 0.001 and 0.005 inches.

References Cited in the file of this patent
UNITED STATES PATENTS

| | | |
|---|---|---|
| 2,773,561 | Hunter | Dec. 11, 1956 |
| 2,911,057 | Green et al. | Nov. 3, 1959 |

FOREIGN PATENTS

| | | |
|---|---|---|
| 22,340 | Great Britain | Dec. 21, 1891 |